United States Patent [19]
Dinsdale

[11] 4,132,414
[45] Jan. 2, 1979

[54] GRAMOPHONE TURNTABLE APPARATUS

[76] Inventor: Jack Dinsdale, 9, Bowling Green Rd., Cranfield, Bedfordshire, England

[21] Appl. No.: 611,393

[22] Filed: Sep. 8, 1975

Related U.S. Application Data

[63] Continuation of Ser. No. 330,068, Feb. 6, 1973, abandoned.

[30] Foreign Application Priority Data

Feb. 7, 1972 [GB] United Kingdom ................ 5660/72

[51] Int. Cl.² .............................................. G11B 3/60
[52] U.S. Cl. ................................................. 274/39 R
[58] Field of Search ............ 274/1 E, 39 R; 308/5 R, 308/9; 318/254

[56] References Cited

U.S. PATENT DOCUMENTS

| | | | |
|---|---|---|---|
| 3,356,876 | 12/1967 | Scholten | 310/164 |
| 3,440,506 | 4/1969 | Krestle et al. | 318/254 X |
| 3,683,248 | 8/1972 | Kobayashi et al. | 318/254 X |
| 3,706,085 | 12/1972 | Mowrey et al. | 274/39 R |
| 3,726,574 | 4/1973 | Tuffias | 308/9 |

*Primary Examiner*—Charles E. Phillips
*Attorney, Agent, or Firm*—Haseltine, Lake & Waters

[57] ABSTRACT

Gramophone turntable apparatus comprises a turntable with a hydrodynamic bearing so that, on rotation, the turntable is supported solely by a pressurized film of fluid. The bearing also supports the rotatable part of a turntable drive motor of rotary or linear form.

15 Claims, 13 Drawing Figures

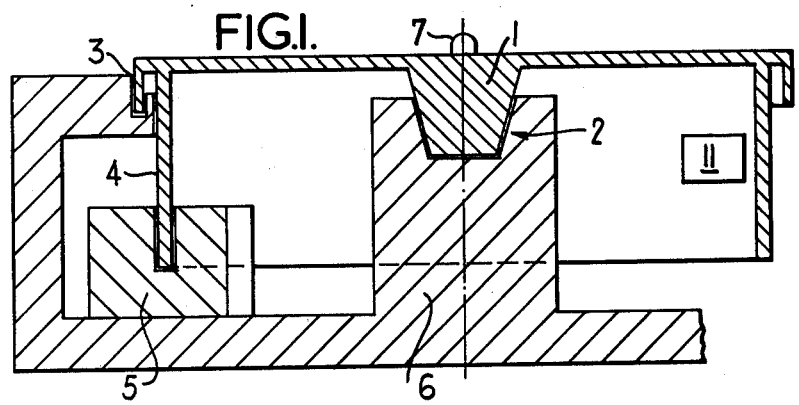
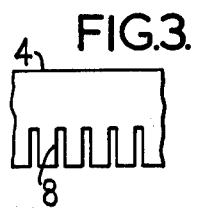
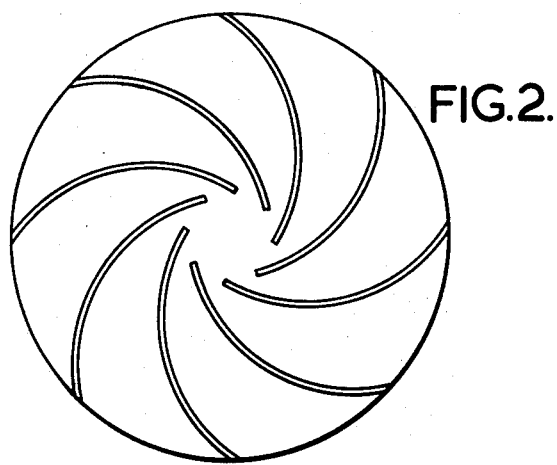

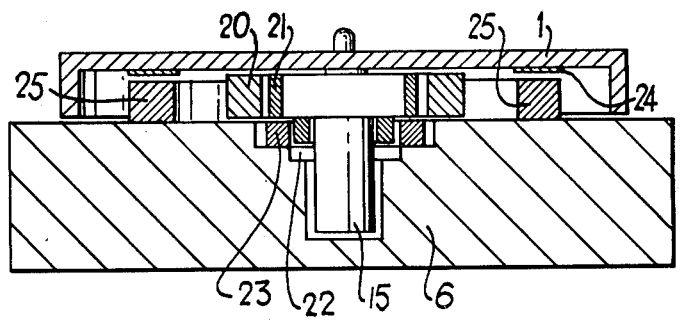
FIG.7a.
FIG.7b.
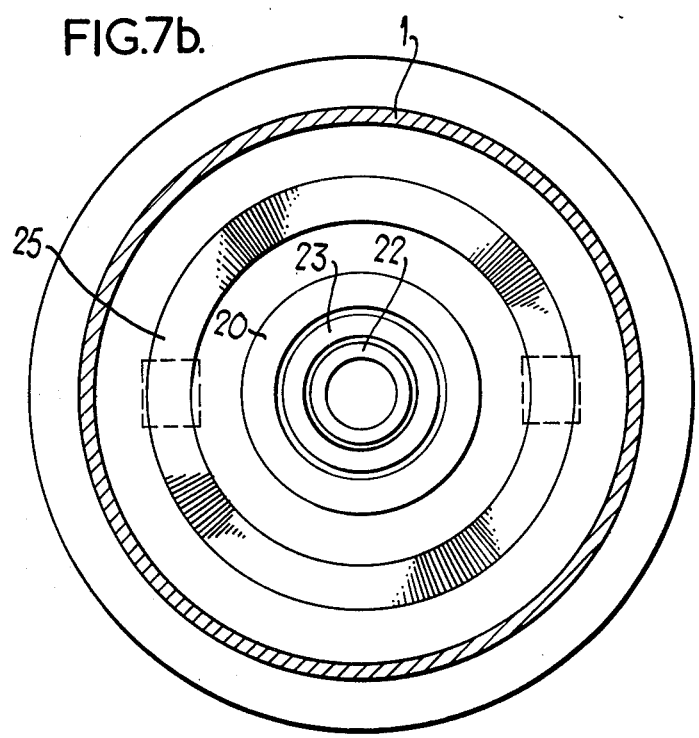

GRAMOPHONE TURNTABLE APPARATUS

This application is a continuation application of Ser. No. 330,068, filed Feb. 6, 1973.

BACKGROUND OF THE INVENTION

This invention relates to gramophone turntable apparatus having a turntable rotatably mounted relative to a support.

Conventionally, the turntable is supported by a bearing having solid-to-solid contact, and this bearing could be a bearing of the drive means for the turntable e.g. the bearing between the rotor and stator of an electrical motor. Such constructions are satisfactory in a great many cases, but involve a considerable manufacturing cost to achieve a sufficiently high quality for modern high fidelity applications. In particular, problems arise in attempting economically to achieve constant speed substantially without bearing rumble, wow and flutter or vertical vibrations transmitted through the bearing means from whatever supports the apparatus.

It is also desirable to screen the pick-up as far as possible from such electrical drive means.

An object of the present invention is to provide turntable apparatus which is improved in at least some of these respects.

SUMMARY OF INVENTION

According to one aspect of the invention, the gramophone turntable apparatus has support means effective to support the turntable, when driven into rotation, such that the turntable will be joined to its support solely by way of fluid, the support means being in the form of hydrodynamic fluid bearing means for supporting the turntable, when it is rotating, on a film of fluid pressurised by the bearing means. Such bearing means are self-pressurising to provide a pressurised film of fluid (e.g. air, oil, mercury or grease, or any combination thereof, e.g. mercury sealed with a layer of grease floating on the mercury), to maintain the fluid film.

One known and suitable form of such bearing means is called a spiralled-groove bearing, at least one of its bearing members containing grooves which extend substantially on archimedean spiral paths and which set up said forces.

In use, the turntable, and the movable parts of the drive means, will float on a film or films of fluid to avoid solid-to-solid contact and to allow the turntable to rotate at a constant speed substantially without bearing rumble, wow and flutter or vertical vibrations transmitted through the bearing means from the support.

A turntable designed for domestic use may use as the bearing medium an oil or grease of sufficient viscosity to support the turntable at low speed (say 5 r.p.m.) and not to spill if the turntable is inverted.

Drive means will advantageously be provided in the form of a motor of linear type, in particular a curvilinear motor. The motor may then comprise a stator which carries motor windings and which defines a gap in which the rotor is to travel without contact with the stator, this stator being positioned at one side of the axis of rotation and coacting with a circularly annular rotor coaxial with and carried by the turntable.

Thus, according to another aspect of the invention, there is provided a gramophone turntable apparatus having a turntable, a support relative to which the turntable is mounted, support means effective to support the turntable, when driven into rotation, such that the turntable will be joined to its support solely by way of fluid, and an electrical, turntable drive, motor of linear form having a wound stator positioned at one side of the axis of rotation of the turntable and an annular rotor carried substantially coaxially by the turntable.

It is preferred that a pick-up be so mounted that it is movable on a path substantially opposite the stator, i.e. contained substantially in a quadrant opposite a quadrant containing the stator, so as to minimise interference between the stator field and the pick-up. For additional protection of the pick-up, the turntable itself is preferably non-magnetic.

In one embodiment of the invention the above features are in combination to provide a turntable which, in use, floats entirely on a fluid film or films without any solid-to-solid surface contact with the turntable either for bearing or drive purposes, and in which the motor windings can be positioned near the circumference of the turntable to minimise interference with the pick-up.

In alternative embodiments, the drive means is a centre-mounted rotary motor with no mechanical contact between its rotor and stator, e.g. a non-synchronous hysteresis, an induction, an eddy current, a brushless d.c. or a synchronous, possibly hysteresis, motor.

There may also be a speed-sensing member associated with the turntable to provide an output supplied to a speed control element to allow servo control of turntable speed. The sensing member may be an a.c. tachogenerator providing an a.c. voltage proportional to speed or digital means employing magnetic or electrooptical effects to produce a signal whose frequency is proportional to speed.

DESCRIPTION OF THE DRAWINGS

For a better understanding of the invention and to show how the same may be carried into effect, reference will now be made, by way of example, to the accompanying drawings, in which:

FIG. 1 shows a section through the centre-line of one embodiment of gramophone turntable apparatus;

FIG. 2 shows a portion of a hydrodynamic bearing;

FIG. 3 shows a portion of a linear motor of the apparatus of FIG. 1;

FIGS. 7a and 7b show a cross-section and plan, with the turntable removed, of a further embodiment.

FIG. 1 shows a vertical section through the axis of rotation of a gramophone turntable apparatus having a circular non-magnetic turntable 1 mounted to rotate in an approximately horizontal plane and having fixed to its upper surface a centring spigot 7 on which to locate the centre hole of a gramophone record. The turntable 1 also has the male part of a hydrodynamic bearing 2 in the shape of a frustrum of a cone on its lower surface, a simple labyrinth 3 to minimise the ingress of dust and a thin, electrically conductive, cylinder 4 which rotates in the gap of a linear motor stator 5 having a length, in the circumferential direction of the turntable, of only a few inches, e.g. three inches or less. A supporting structure 6 provides fixing for the linear motor stator 5 and also holds at its centre the female part or cup of the hydrodynamic bearing 2. This female part or cup is also in the form of a frustrum of a cone, but in this case the lower, flat, surface of the cup is formed with suitably curved indentations, shown in plan in FIG. 2, to enable the hydrodynamic bearing to operate. Alternatively these indentations may be made in the male part of the bearing. In general, the bearing may be constructed on the principles and with the features of known hydrodynamic spiral-grooved bearings, whether of planar, spherical or conical form. The indentations or grooves may be formed on both bearing parts and might also exist on the conical surface of at least one of the parts. Moreover, the indentations or grooves may be of aerofoil shape. The bearing is filled with a suitable oil or grease to provide a fluid bearing film, and the oil or grease is of high viscosity so that the turntable is entirely supported by the film at a low speed (say 5 r.p.m.) and so that the grease or oil does not run out if the unit is inverted.

The curvilinear motor stator 5 has a coil arrangement which provides a moving magnetic field across the stator gap when fed from a suitable source of alternating current. The cylinder 4 on the turntable has a large number of vertical slits 8 cut into it, shown in FIG. 3, which, in conjunction with the frequency of the alternating current, provide for the turntable to rotate at the appropriate speed or speeds. The motor may be operated either from standard ac mains of 50 Hz frequency, or from a high stability electronic oscillator and power amplifier. In either case, the pitch of the slits in cylinder 4 will be calculated to suit the chosen ac frequency.

The speed of rotation may be varied slightly either by a form of electrodynamic braking, in which an additional path is introduced into the magnetic circuit, or by varying the frequency of the ac source. In addition, the slits in cylinder 4 may be arranged at a slight angle to the vertical to reduce speed variations as each segment enters the magnetic field in the stator gap.

In one embodiment, the winding of the stator 5 is connected directly to the ac mains, and relies on mains frequency for its speed control. In another case a separate high-precision transistor oscillator and an amplifier are used to provide an independent frequency standard which can be varied manually to select the basic speed and to make small adjustments for musical pitch correction. Feedback may be incorporated into the circuit from a speed sensor diagrammatically shown at 11 in FIG. 1.

Figure 5:
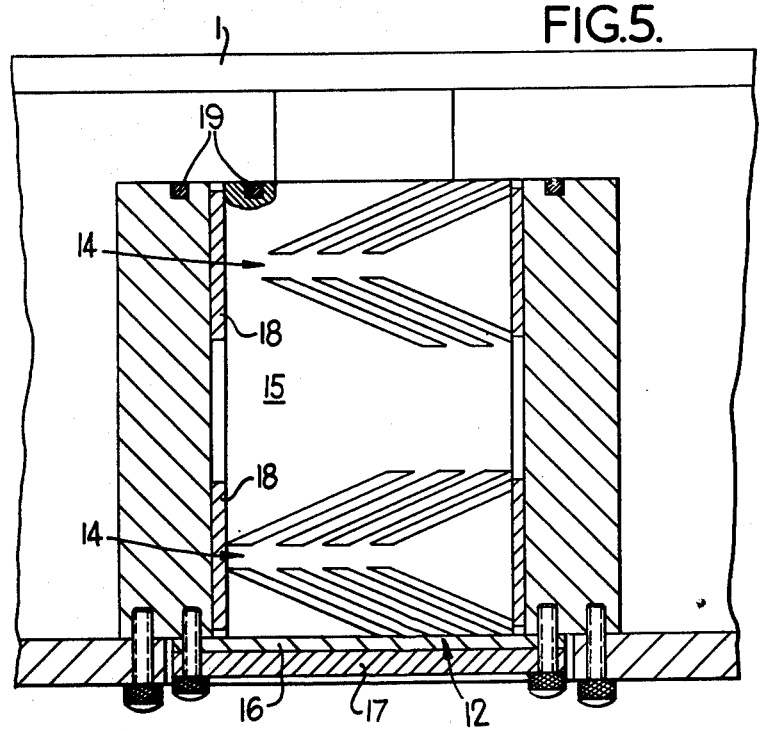
FIG. 5 shows a preferred form of bearing structure for the apparatus of FIG. 1.
Figure 6:
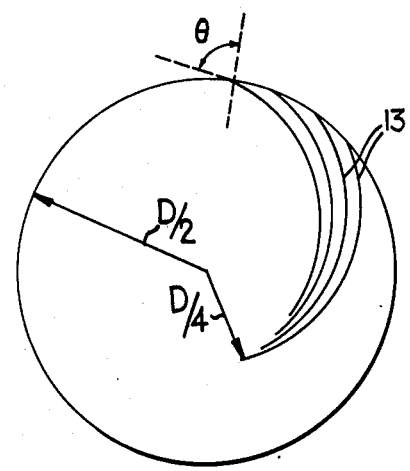
FIG. 6 shows a detail of FIG. 5.

A further embodiment of the invention will now be described with reference to FIGS. 5 and 6. This embodiment incorporates a bearing structure designed for unidirectional operation at 30 to 50 r.p.m. and which is fluid borne at 4 r.p.m. The bearing structure is hydrodynamic with a thrust bearing 12 and journal bearings 14. The thrust bearing 12 is of the blocked centre type (FIG. 6) with inward pumping grooves 13. Using oil of viscosity $2.5 \times 10^{-6}$ Reyns.lb.sec/in.$^2$, the thrust bearing dimensions could be as follows:

Number of grooves — 10 to 15
Depth of grooves — $5 \times 10^{-4}$ inches
Groove angle $\ominus$ — 74.5°
Groove ridge ratio — 1
External radius of grooves — 1 inch
Internal radius of grooves — 0.5 inches.

Theoretically, the grooves are equiangular spirals but this is not absolutely vital, circular arcs being sufficient.

With this design, it is estimated that the bearing will achieve an operating spacing of about $2 \times 10^{-4}$ inches.

The grooves are formed on the base surface of a cylindrical shaft 15 and coact with a low friction plate 16 of "glacier D.U." material resin bonded to a mild steel backing plate 17.

For the journal bearing of this apparatus, there are a number of mutilated surface journals which can be used as well as tilting pad type bearings, all of which will give some bearing stiffness under zero load conditions. Although pure radial load will hardly exist, the journal has to resist a moment of 0.25 lb.inches plus the possible moment due to the offset loading of the main axial load.

Tilting pad types of journal are probably not an advantage in view of cost, but hydrodynamic journals having surface mutilations or controlled out-of-roundness can suppress half speed whirl and appear to be suitable. Of the mutilated bearings, the herring bone groove type is considered the most efficient and suitable in the present context. As a nominal thrust bearing diameter of 1 inch and a length of 4 inches are available, a two journal bearing structure has been illustrated for this embodiment, although a single journal bearing would also be possible.

In the particular form illustrated, the axial length of each individual journal 14 is about one half of the journal diameter and the distance between centres of the journals is about twice that diameter. The length of shaft 15 to accommodate the two journals is about 3 times the journal diameter. These journals have been designed for a radial clearance between the shaft 15 and bushes 18 of no larger than $1 \times 10^{-3}$ inches and no less than $5 \times 10^{-4}$ inches. In this design the optimum groove angle is 23.26 degrees and the axial groove length is 0.45 inches. The groove to ridge width ratio is 1 : 1.

The bearing structure so far described is adequate for applications where, after the oil has been loaded into the bearing structure, the apparatus is not subjected to excessive tilting. If, however, it is required to load the oil and thereafter be able to tilt the apparatus, O-rings 19 may be provided in the structure to seal with some suitable removable member during transit.

FIGS. 7a and 7b show a further embodiment utilising a rotary motor of synchronous or non-synchronous form with a stator ring 20 and a rotor 21 attached to the bearing shaft 15.

Sensing means in two alternative forms are shown in FIGS. 7a and 7b to provide rate feedback.

In one form this sensing means is a tachogenerator having a rotor 22 and a stator 23.

In the other form the sensing means comprises an optical or magnetic digitiser ring 24 with a sensing head or heads 25.

Yet another alternative has a large diameter bearing with the motor coaxially within it.

FIGS. 4a to 4f show diagrammatically various alternative control systems for the motor 26 of the apparatus.

Figure 4:
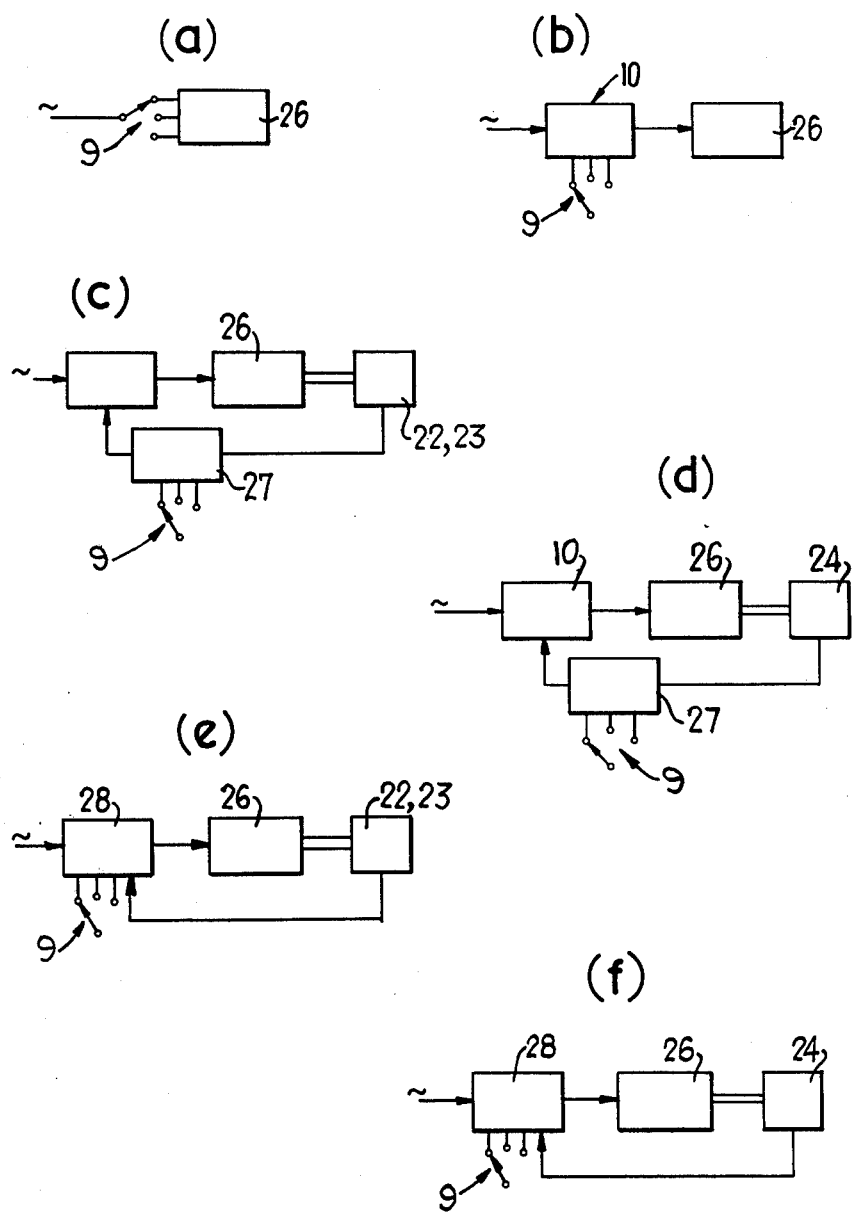
FIGS. 4a to 4f show circuit diagrams.

In FIG. 4a the motor is synchronous and mains frequency and winding selection by a switch 9 determine speed.

In FIG. 4b the synchronous motor 26 is controlled by a precision oscillator 10 the output frequency of which is determined by a speed selector switch 9.

In FIG. 4c the synchronous motor 26 is controlled by a variable oscillator 10 controlled by a controller 27 the desired value for which is supplied by switch 9 and the actual value for which is supplied by tachogenerator 22, 23. FIG. 4d shows an alternative to FIG. 4c utilising the digitiser 24.

FIGS. 4e and 4f show voltage controllers 28 for a non-synchronous motor 26, in one case controlled by the tachogenerator 22, 23 and in the other case controlled by the digitiser 24.

I claim:

1. A gramophone turntable apparatus having a support, turntable, and hydrodynamic bearing means including pumping grooves supporting the turntable for rotation relative to said support, a fluid film of high viscosity being interposed between said bearing and said turntable, the hydrodynamic bearing having pumping grooves for axial thrust support of the turntable, when it is rotating, on said film of fluid pressurized by the bearing means and for the radial support of the turntable on said fluid, and motor means for producing an operative gramophone speed for said turntable, the pumping grooves being dimensioned and orientated for support of the turntable solely by said fluid at speeds below 16 r.p.m.

2. A turntable apparatus as claimed in claim 1, wherein said bearing means has curved pumping grooves.

3. A turntable apparatus as claimed in claim 2, including a thrust bearing portion with spirally extending pumping grooves.

4. A turntable apparatus as claimed in claim 1, including turntable drive means for providing a contactless inductive coupling with the turntable.

5. A turntable apparatus as claimed in claim 4, wherein said drive means is an electrical motor of linear type having a wound stator positioned at one side of the axis of rotation of said turntable and an annular rotor carried substantially coaxially by said turntable.

6. A turntable apparatus as claimed in claim 4, wherein said drive means is a rotary electrical motor which is coaxial with said bearing means.

7. A turntable apparatus as claimed in claim 6, wherein said motor encircles a turntable portion carrying a rotary part of said bearing means.

8. A turntable apparatus as claimed in claim 1, including a cylindrical journal bearing portion having a herringbone pattern of pumping grooves.

9. A turntable apparatus as claimed in claim 1, comprising electrical drive means for said turntable; control means for the drive means; turntable speed sensing means; and a feedback path of said control means including said sensing means.

10. A turntable apparatus as claimed in claim 9, wherein said drive means is non-synchronous and said control means include a voltage controller.

11. A turntable apparatus as claimed in claim 9, wherein said drive means is synchronous and said control means includes a controllable frequency generator.

12. A turntable apparatus as claimed in claim 9, wherein said sensing means is a tachogenerator.

13. A turntable apparatus as claimed in claim 9, wherein said sensing means is a digitizer.

14. A turntable apparatus according to claim 1, wherein the turntable is non-magnetic.

15. A gramophone turntable apparatus having a turntable, a support, hydrodynamic support means supporting said turntable for rotation relative to said support, a high-viscosity fluid interposed between said hydrodynamic support means and said turntable, said hydrodynamic support means including pumping grooves being effective to support the turntable radially and axially on said fluid, when driven into rotation at an operative gramophone speed, such that the turntable will be joined to its support solely by way of the fluid, and an electrical, turntable drive, motor of linear type for producing said operative speed of the turntable and having a wound stator positioned at one side of the axis of rotation of said turntable and an annular rotor carried substantially coaxially by said turntable, said hydrodynamic support means comprising fluid pumping grooves dimensioned and oriented for support of the turntable on said fluid at said operative speed.

* * * * *